US012766402B2

(12) United States Patent
Liu et al.

(10) Patent No.: US 12,766,402 B2
(45) Date of Patent: Oct. 20, 2026

(54) KEY TRAVEL ADJUSTABLE SWITCH

(71) Applicant: QANBA USA, LLC, Daly City, CA (US)

(72) Inventors: Kai Liu, Daly City, CA (US); Jeffrey Lyo, Daly City, CA (US)

(73) Assignee: QANBA USA, LLC, Daly City, CA (US)

( * ) Notice: Subject to any disclaimer, the term of this patent is extended or adjusted under 35 U.S.C. 154(b) by 201 days.

(21) Appl. No.: 18/890,664

(22) Filed: Sep. 19, 2024

(65) Prior Publication Data

US 2025/0367541 A1 Dec. 4, 2025

(30) Foreign Application Priority Data

May 30, 2024 (CN) ......................... 202421205962.6

(51) Int. Cl.
*A63F 13/24* (2014.01)

(52) U.S. Cl.
CPC .................................... *A63F 13/24* (2014.09)

(58) Field of Classification Search
CPC ....................................................... A63F 13/24
USPC ........................................................... 463/37
See application file for complete search history.

(56) References Cited

U.S. PATENT DOCUMENTS 4,749,826 A 6/1988 Saito
6,344,791 B1 * 2/2002 Armstrong ......... G05G 9/04737 338/114
10,188,940 B2 * 1/2019 Burgess .................. A63F 13/24
10,806,994 B2 * 10/2020 Chou ...................... A63F 13/22
11,333,318 B2 * 5/2022 Miao ....................... F21V 19/00
2020/0218305 A1 * 7/2020 Chan ........................ G05G 5/04
2023/0140183 A1 * 5/2023 Samperi .................. A63F 13/22 463/37
2025/0367542 A1 * 12/2025 Liu ........................ H01H 19/14
2025/0372318 A1 * 12/2025 Liu .......................... H01H 9/06
2025/0372321 A1 * 12/2025 Liu ........................ H01H 13/18

FOREIGN PATENT DOCUMENTS

CN 216653352 U 6/2022
CN 217311894 U 8/2022

* cited by examiner

*Primary Examiner* — Michael A Cuff

(74) *Attorney, Agent, or Firm* — Womble Bond Dickinson (US) LLP

(57) ABSTRACT

Disclosed is a key travel adjustable switch, including a microswitch pin, a switch cap connected to the microswitch pin, a switch cap silicone arranged between the switch cap and the microswitch pin, a switch body, and a rotary ring rotatably connected to the switch body and having a plurality of travel adjusting portions of different heights arranged at a lower edge of the rotary ring. The plurality of travel adjusting portions structurally matches with a travel positioning portion arranged on the switch cap, and the rotary ring is rotatable to position the travel positioning portion at different travel adjusting portions to adjust the key travel of the key travel adjustable switch, so as to adjust the respond speed of the key travel adjustable switch, and thus improve the experience feeling of a user.

20 Claims, 5 Drawing Sheets

A-A

FIG. 1
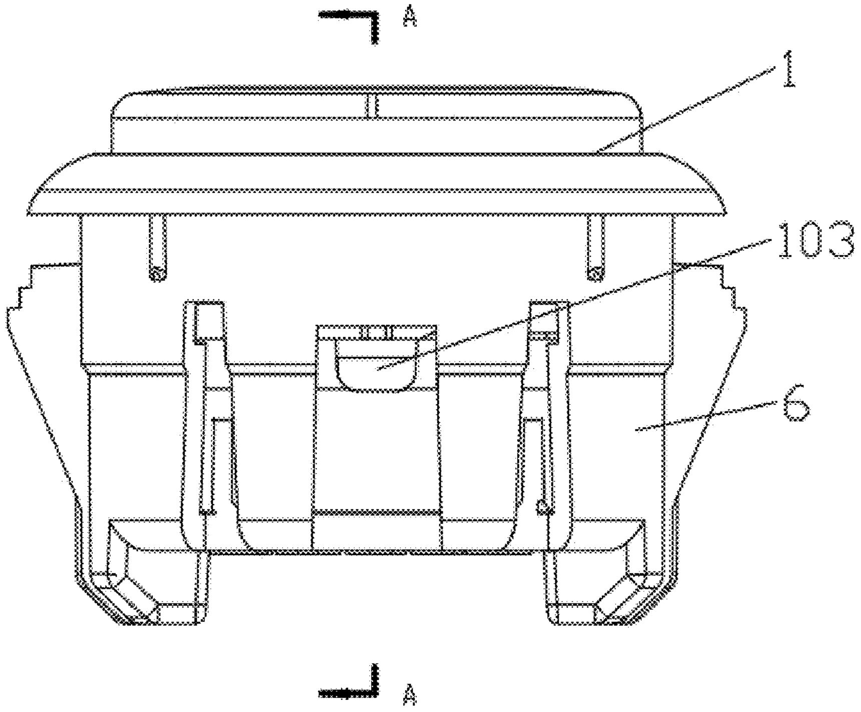
A-A
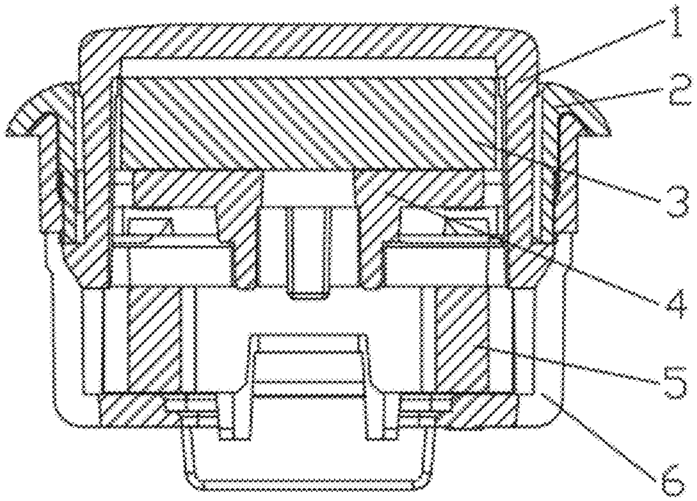
FIG. 2

KEY TRAVEL ADJUSTABLE SWITCH

CROSS-REFERENCE TO RELATED APPLICATION(S)

The present application claims priority to and the benefit of Chinese Patent Application No. 202421205962.6, filed on May 30, 2024, in China National Intellectual Property Administration, the entire disclosure of which is incorporated herein by reference.

TECHNICAL FIELD

The present disclosure relates to the field of a switch, a game peripheral including the switch, and particularly relates to a key travel adjustable switch with a rotary ring.

BACKGROUND

Most trigger travels of current game switch products in the field of game peripherals are single and fixed. Switches that adjust the trigger travels depending on drive on the market are tedious, and the key travel is not changed with variation of the trigger travel. Therefore, users have no intuitive feeling between the key travel and the point at which the switch is triggered. With the development of electronic competitive games, the users have increasing high requirements on game peripherals, i.e., quick response to pressing. However, existing game switches cannot meet the high requirements of the users.

SUMMARY

To solve the above problem, objectives of the present disclosure are to provide a switch having an adjustable key travel, a gaming peripheral including the switch, and a method for adjusting the switch.

The present disclosure achieves the above objectives by the following technical solutions:

In the first aspect, a key travel adjustable switch may include a microswitch pin, a switch cap connected to the microswitch pin, a switch cap silicone arranged between the switch cap and the microswitch pin, a switch body, and a rotary ring rotatably connected to the switch body and having a plurality of travel adjusting portions of different heights arranged at a lower edge of the rotary ring, and the plurality of travel adjusting portions may structurally match with a travel positioning portion arranged on the switch cap. The rotary ring may be rotatable to position the travel positioning portion at different travel adjusting portions to adjust a key travel of the key travel adjustable switch.

In one or more embodiments, the switch cap may include a body, the travel positioning portion, and clamping boards, the travel positioning portion and the clamping boards may both be formed at a lower edge of the body of the switch cap, the clamping boards may be respectively arranged on both sides of the travel positioning portion, and a gap may be reserved between the clamping board and the travel positioning portion.

In one or more embodiments, a position-limiting protrusion may be formed at a side edge of the switch cap silicone, and the position-limiting protrusion may be clamped in the gap between the clamping board and the travel positioning portion.

In one or more embodiments, a positioning protrusion may be formed at a side edge of the microswitch pin, and the positioning protrusion may match with a clamping hole formed in each of the clamping boards.

In one or more embodiments, a clamping protrusion and a supporting step may be arranged in the switch body, and an avoiding groove may be formed in an outer side surface of the switch body, and the plurality of travel adjusting portions may be supported by the supporting step, the travel positioning portion on the switch cap may be positioned at the avoiding groove, and the clamping protrusion may be fit to slide within a position adjusting hole formed in a side position-limiting plate where the plurality of travel adjusting portions is located at.

In one or more embodiments, the travel positioning portion may be a positioning clamping foot, the travel adjusting portions may be edges of different heights, and the edges of different heights may be smoothly connected.

In one or more embodiments, a silicone gasket may be further mounted in the switch body.

In one or more embodiments, the key travel may range from 0.1 mm to 3 mm.

In one or more embodiments, a number of the plurality of travel adjusting portions may be from 2 to 10.

In one or more embodiments, the key travel adjustable switch may be a keyboard key, a gamepad switch, or an arcade game switch.

In the second aspect, the present disclosure provides a gaming peripheral including the key travel adjustable switch described above.

In the third aspect, the present disclosure provides a method for adjusting the key travel adjustable switch described above. The method may include rotating the rotary ring to position the travel positioning portion at different travel adjusting portions to adjust the key travel of the key travel adjustable switch.

To sum up, the present disclosure has the following beneficial effects: by rotating the rotary ring, the travel positioning portion of the switch cap may match with travel adjusting portions of different heights at the lower edge of the rotary ring to adjust the key travel of the key travel adjustable switch, so as to adjust a respond speed of the key travel adjustable switch and thereby improving the feeling (e.g., game feel) of the user.

BRIEF DESCRIPTION OF FIGURES

In order to describe the embodiments of the present disclosure or the technical solutions in the prior art more clearly, brief introduction on drawings needed to be used in the embodiments will be made below. Apparently, the drawings described below are some embodiments of the present disclosure, and a person skilled in the technical field further can obtain other drawings according to the drawings without making creative efforts.

FIG. 1 is a front view of a switch of the present disclosure;

FIG. 2 is an A-A section view of FIG. 1;

LIST OF REFERENCE NUMERALS

Figure 3:
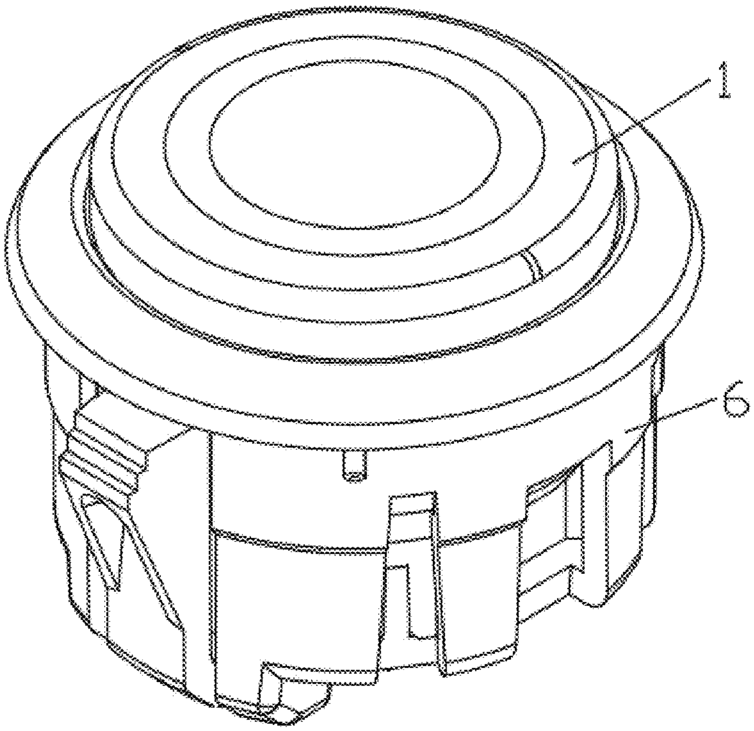
FIG. 3 is an axonometric drawing of FIG. 1.
Figure 4:
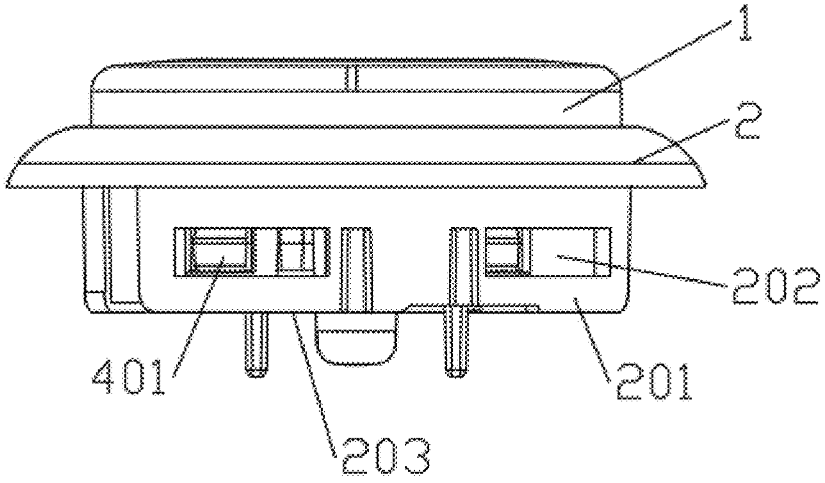
FIG. 4 is a structural diagram of a switch cap, a rotary ring, and a microswitch pin of the present disclosure.

1: switch cap; 101: body of the switch cap; 102: clamping board; 103: travel positioning portion; 2: rotary ring; 201: side limiting plate; 202: position adjusting hole; 203: travel adjusting portion; 3: switch cap silicone; 301: position-limiting protrusion; 4: microswitch pin; 401: positioning protrusion; 5: silicone gasket; 6: switch body; 601: clamping protrusion; 602: supporting step; and 603: avoiding groove.

DETAILED DESCRIPTION

In order to make objectives, technical solutions and advantages of the present disclosure clearer, the technical solutions of the present disclosure will be further described in detail below. Apparently, the described embodiments are merely examples of a part of embodiments of the present disclosure and are not all the embodiments. On the basis of the embodiments in the present disclosure, all other implementations obtained by a person of ordinary skill in the art without creative efforts fall into the scope of protection of the present disclosure.

Referring to FIGS. 1 to 9, the present disclosure provides a switch having an adjustable key travel. The switch may include a switch cap 1, a rotary ring 2, switch cap silicone 3, a microswitch pin 4, and a switch body 6. As used herein, the term “switch” may be a key, a button, or a switch that is actuated/triggered to change its state. A switch actuation of the switch may be occurred by any suitable physical interaction with the switch which may cause a mechanical linkage inside the switch to come into, or go out of, contact. For example, a physical interaction may be pushing, sliding, rotating, pulling, heating, and/or magnetizing. In one or more embodiments, the switch may be a magnetic switch, a capacitive switch, and a hall effect switch. In one or more embodiments, the switch may be a momentary push-down switch. The switch cap 1 may be connected to the microswitch pin 4. For example, the switch cap 1 may be snapped to the microswitch pin 4. The switch cap silicone 3 may be arranged between the switch cap 1 and the microswitch pin 4, and the rotary ring 2 may be connected to the switch body 6 and may be rotated relatively to the switch body 6. In one embodiment, the rotary ring 2 may be an edge in a shape of a hat brim, or an annular shape. In one embodiment, the rotary ring 2 may be snapped to the switch body 6. A plurality of travel adjusting portions 203 of different heights may be arranged at a lower edge of the rotary ring 2, and two or three travel adjusting portions 203 may be provided, which means that the switch may provide two or three adjustable key travels. The travel adjusting portions 203 may match with a travel positioning portion 103 arranged on the switch cap 1. By rotating the rotary ring 2, the travel positioning portion 103 may match with different travel adjusting portions 203 to adjust an adjustable key travel. In one or more embodiments, the travel positioning portion 103 may be a positioning clamping foot, and the travel adjusting portions 203 may be edges of different heights, and each of the edges may be smoothly connected with each other.

With adoption of the above technical solutions, when the switch is in use, by rotating the rotary ring 2, the positioning clamping foot of the switch cap 1 may be connected to the lower edge of the rotary ring 2 without a circumferential rotation, for example, the positioning clamping foot of the switch cap 1 may be snapped to fit to the rotary ring 2. The switch cap 1 may be further connected to the microswitch pin 4, for example, the switch cap 1 may be snapped to the microswitch pin 4. The travel adjusting portions 203 formed at the edges of different heights below the rotary ring 2 may adjust a height of the switch cap 1, so that the adjustable key travel may be adjusted.

In one or more embodiments, the switch cap 1 may include a body of the switch cap 101, a travel positioning portion 103, and clamping boards 102. The travel positioning portion 103 and clamping boards 102 may be both formed at the lower edge of the body of the switch cap 101. The clamping boards 102 may be respectively arranged on both sides of the travel positioning portion 103. A gap may be reserved between the clamping board 102 and the travel positioning portion 103. There are two symmetrically arranged travel positioning portions 103 to improve the stability of the adjustable key travel.

Figure 6:
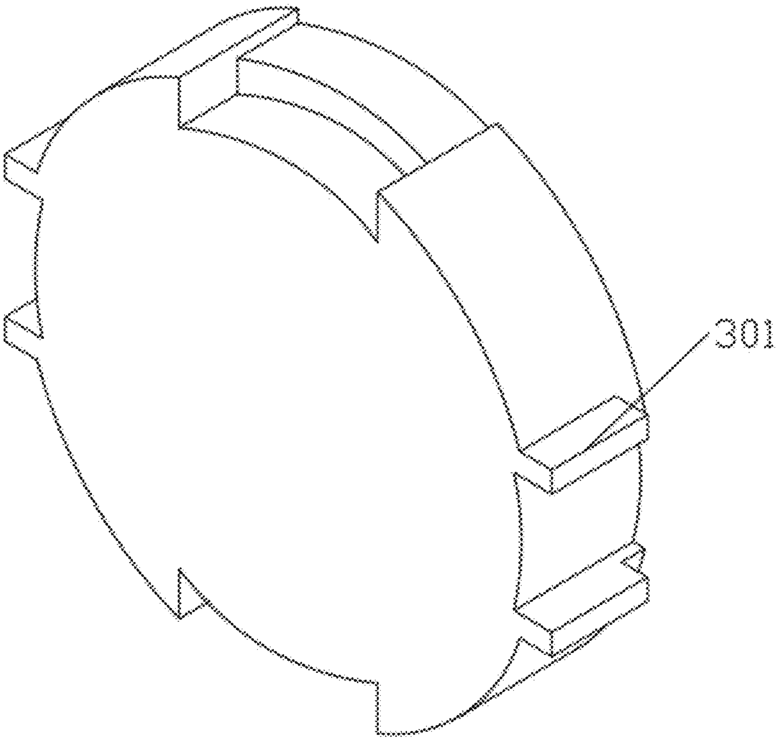
FIG. 6 is a three-dimensional view of switch cap silicone of the present disclosure.
Figure 7:
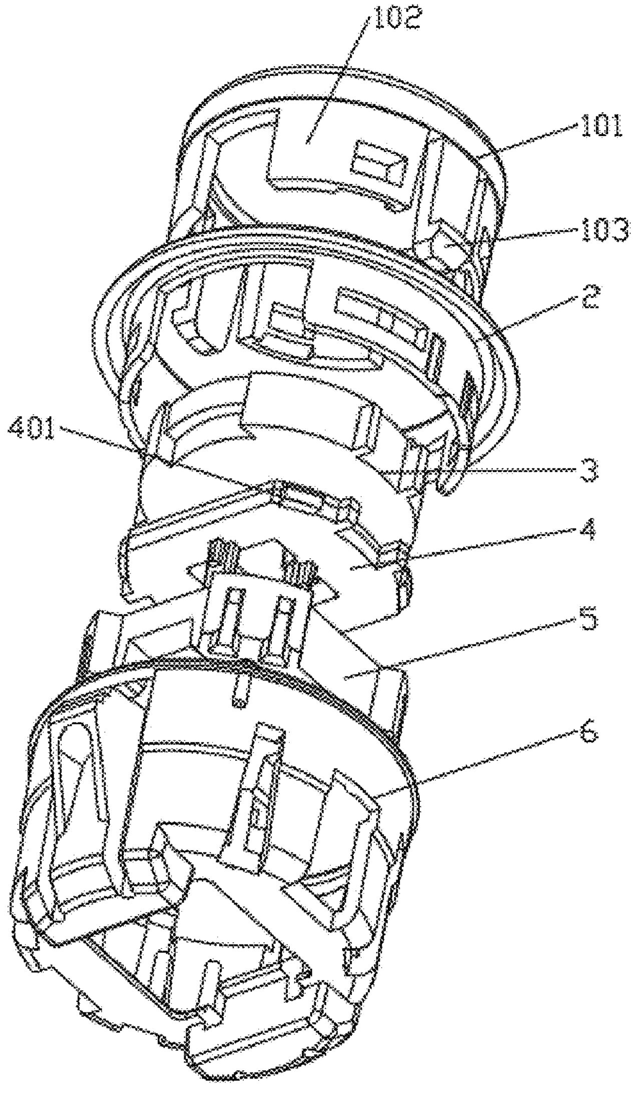
FIG. 7 is an exploded view of the switch of the present disclosure.

Furthermore, referring to FIG. 6, in one or more embodiments, a position-limiting protrusion 301 may be formed at a side edge of the switch cap silicone 3, and the position-limiting protrusion 301 may be clamped in the gap between the clamping board 102 and the travel positioning portion 103 to position the switch cap silicone 3 circumferentially. When pressing the switch cap 1, the switch cap silicone 3 may provide a rebound effect on the switch cap 1.

A positioning protrusion 401 may be formed at a side edge of the microswitch pin 4, and the positioning protrusion 401 may match with a clamping hole formed in the clamping board 102. That is, the microswitch pin 4 may be fitted with the switch cap 1 in a stationary manner. Furthermore, the microswitch pin 4 may be fixedly connected to a microswitch.

Figure 5:
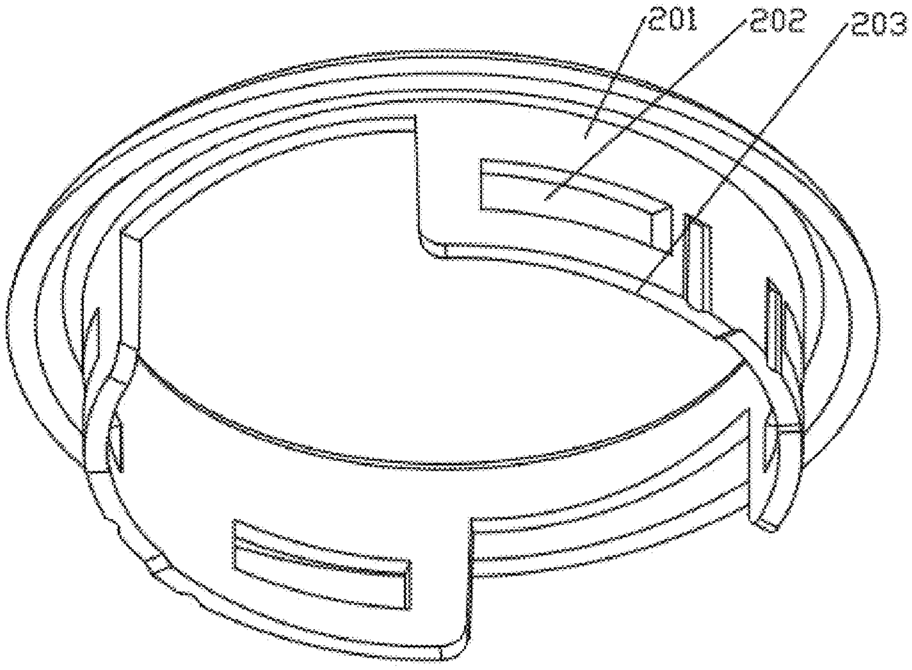
FIG. 5 is a three-dimensional view of the rotary ring of the present disclosure.
Figure 8:
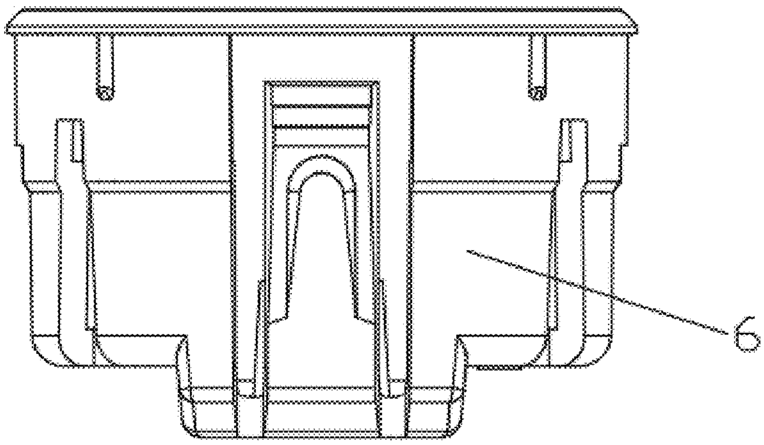
FIG. 8 is a left view of a switch body of the present disclosure.
Figure 9:
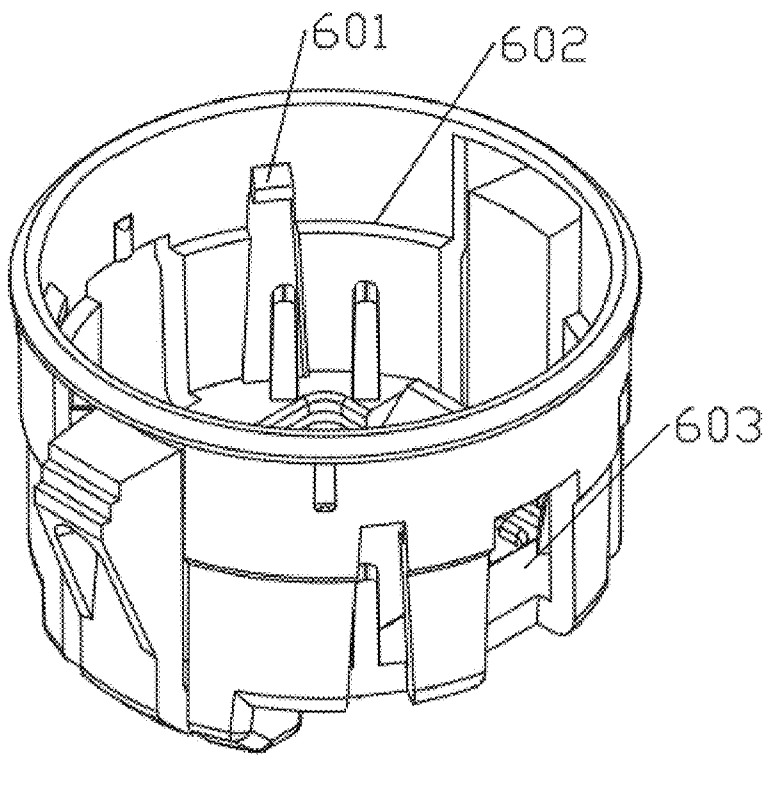
FIG. 9 is an axonometric drawing of FIG. 8.

Referring to FIG. 8 and FIG. 9, in one or more embodiments, a clamping protrusion 601 and a supporting step 602 may be arranged in the switch body 6, and an avoiding groove 603 is formed in an outer side surface of the switch body 6. The supporting step 602 may fit with and support the travel adjusting portions 203 at the lower edge of the rotary ring 2. The travel positioning portion 103 on the switch cap 1 may be arranged at the avoiding groove 603. The clamping protrusion 601 may fit with and be able to be slid within the position adjusting hole 202 formed in the side limiting plate 201, where the travel adjusting portions 203 are located. In one or more embodiments, the position adjusting hole 202 may be a strip-shaped hole (as shown in FIG. 5). In such a structural design, the switch cap 1 does not rotate in use, and the rotary ring 2 may be rotated along the supporting step 602 to adjust the adjustable key travel.

In one or more embodiments, a silicone gasket 5 may be further fitted with the switch body 6 and be mounted in the switch body 6, so that the hand feeling of the switch for the user may be improved (e.g., to soften the impact upon reaching the end of the key travel).

Furthermore, the adjustable key travel may range from 0.1 mm to 3 mm. The adjustable key travel may be a distance that the switch cap 1 is moved downwards after being pressed. In one or more embodiments, the adjustable key travel may range from 0.5 mm to 1.5 mm. More specifically, the adjustable key travel may range from 0.8 mm to 1.2 mm. For example, three adjustable key travels may be provided within a distance ranging from 0.8 mm to 1.2 mm, that is, the switch may have three adjustable key travels, including a first key travel of 0.8 mm, a second key travel of 1.0 mm, and a third key travel of 1.2 mm.

Furthermore, a number of the plurality of travel adjusting portions may be from 2 to 10.

Furthermore, the adjustable switch in the present disclosure may be a keyboard key, a gamepad switch, or an arcade game switch.

The present disclosure provides a game peripheral, including the above adjustable switch.

The present disclosure may further provide a method for adjusting the above adjustable switch. The method may include arranging the plurality of travel adjusting portions of different heights at a lower edge of the rotary ring. The plurality of travel adjusting portions may structurally match with a travel positioning portion arranged on the switch cap, and the method may further include rotating the rotary ring to position the travel positioning portion at different travel adjusting portions to adjust the adjustable key travel of the switch.

The above is merely the specific implementations of the present disclosure and is not intended to limit the scope of protection of the present disclosure. Any variations or replacements apparent to a person skilled in the art within the technical scope disclosed by the present disclosure shall fall within the scope of protection of the present disclosure. Therefore, the scope of protection of the present disclosure shall be subject to the scope of protection of the claims.

What is claimed is:

1. A key travel adjustable switch, comprising:

a microswitch pin;

a switch cap connected to the microswitch pin;

a switch cap silicone arranged between the switch cap and the microswitch pin;

a switch body; and a rotary ring rotatably connected to the switch body and having a plurality of travel adjusting portions of different heights arranged at a lower edge of the rotary ring, the plurality of travel adjusting portions structurally matching with a travel positioning portion arranged on the switch cap, wherein the rotary ring is rotatable to position the travel positioning portion at different travel adjusting portions to adjust a key travel of the key travel adjustable switch.

2. The key travel adjustable switch according to claim 1, wherein the switch cap comprises a body, the travel positioning portion, and clamping boards, the travel positioning portion and the clamping boards are formed at a lower edge of the body of the switch cap, the clamping boards are respectively arranged on both sides of the travel positioning portion, and a gap is reserved between the clamping boards and the travel positioning portion.

3. The key travel adjustable switch according to claim 2, wherein a position-limiting protrusion is formed at a side edge of the switch cap silicone, and the position-limiting protrusion is clamped in the gap between the clamping boards and the travel positioning portion.

4. The key travel adjustable switch according to claim 3, wherein a positioning protrusion is formed at a side edge of the microswitch pin, and the positioning protrusion matches with a clamping hole formed in each of the clamping boards.

5. The key travel adjustable switch according to claim 2, wherein a clamping protrusion and a supporting step are arranged in the switch body, and an avoiding groove is formed in an outer side surface of the switch body; and the plurality of travel adjusting portions is supported by the supporting step, the travel positioning portion on the switch cap is positioned at the avoiding groove, and the clamping protrusion is fit to slide within a position adjusting hole formed in a side position-limiting plate where the plurality of travel adjusting portions is located at.

6. The key travel adjustable switch according to claim 2, wherein the travel positioning portion is a positioning clamping foot, the plurality of travel adjusting portions is edges of different heights, and the edges of different heights are smoothly connected.

7. The key travel adjustable switch according to claim 6, wherein a silicone gasket is further mounted in the switch body.

8. The key travel adjustable switch according to claim 1, wherein the key travel ranges from 0.1 mm to 3 mm.

9. The key travel adjustable switch according to claim 1, wherein a number of the plurality of travel adjusting portions is from 2 to 10.

10. The key travel adjustable switch according to claim 1, wherein the key travel adjustable switch is a keyboard key, a gamepad switch, or an arcade game switch.

11. A gaming peripheral, comprising a key travel adjustable switch, wherein the key travel adjustable switch comprises:

a microswitch pin;

a switch cap connected to the microswitch pin;

a switch cap silicone arranged between the switch cap and the microswitch pin;

a switch body; and a rotary ring rotatably connected to the switch body and having a plurality of travel adjusting portions of different heights arranged at a lower edge of the rotary ring, the plurality of travel adjusting portions structurally matching with a travel positioning portion arranged on the switch cap, wherein the rotary ring is rotatable to position the travel positioning portion at different travel adjusting portions to adjust a key travel of the key travel adjustable switch.

12. The gaming peripheral according to claim 11, wherein the switch cap comprises a body, the travel positioning portion, and clamping boards, the travel positioning portion and the clamping boards are formed at a lower edge of the body of the switch cap, the clamping boards are respectively arranged on both sides of the travel positioning portion, and a gap is reserved between the clamping boards and the travel positioning portion.

13. The gaming peripheral according to claim 12, wherein a position-limiting protrusion is formed at a side edge of the switch cap silicone, and the position-limiting protrusion is clamped in the gap between the clamping boards and the travel positioning portion.

14. The gaming peripheral according to claim 13, wherein a positioning protrusion is formed at a side edge of the microswitch pin, and the positioning protrusion matches with a clamping hole formed in each of the clamping boards.

15. The gaming peripheral according to claim 12, wherein a clamping protrusion and a supporting step are arranged in the switch body, and an avoiding groove is formed in an outer side surface of the switch body; and the plurality of travel adjusting portions is supported by the supporting step, the travel positioning portion on the switch cap is positioned at the avoiding groove, and the clamping protrusion is fit to slide within a position adjusting hole formed in a side position-limiting plate where the plurality of travel adjusting portions is located at.

16. The gaming peripheral according to claim 12, wherein the travel positioning portion is a positioning clamping foot, the plurality of travel adjusting portions is edges of different heights, and the edges of different heights are smoothly connected.

17. The gaming peripheral according to claim 16, wherein a silicone gasket is further mounted in the switch body.

18. The gaming peripheral according to claim 11, wherein the key travel ranges from 0.1 mm to 3 mm.

19. The gaming peripheral according to claim 11, wherein a number of the plurality of travel adjusting portions is from 2 to 10.

20. A method for adjusting a key travel adjustable switch, wherein the key travel adjustable switch comprises:

a microswitch pin;

a switch cap connected to the microswitch pin;

a switch cap silicone arranged between the switch cap and the microswitch pin;

a switch body; and a rotary ring rotatably connected to the switch body and having a plurality of travel adjusting portions of different heights arranged at a lower edge of the rotary ring, the plurality of travel adjusting portions structurally matching with a travel positioning portion arranged on the switch cap, and the method comprising:

rotating the rotary ring to position the travel positioning portion at different travel adjusting portions to adjust a key travel of the key travel adjustable switch.

* * * * *